US007505486B2

(12) United States Patent
Sharma

(10) Patent No.: US 7,505,486 B2
(45) Date of Patent: Mar. 17, 2009

(54) DEGRADABLE NETWORK DATA PATH TRANSMISSION SCHEME

(75) Inventor: Debendra Das Sharma, Santa Clara, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1209 days.

(21) Appl. No.: 10/300,444

(22) Filed: Nov. 19, 2002

(65) Prior Publication Data

US 2004/0095967 A1 May 20, 2004

(51) Int. Cl.
*H04J 3/04* (2006.01)
*G01R 31/08* (2006.01)
(52) U.S. Cl. .................................. 370/536; 370/225
(58) Field of Classification Search .................. None
See application file for complete search history.

(56) References Cited

U.S. PATENT DOCUMENTS

| | | | |
|---|---|---|---|
| 4,361,869 A | 11/1982 | Johnson et al. | |
| 4,412,281 A | 10/1983 | Works | |
| 4,701,756 A | 10/1987 | Burr | |
| 5,065,396 A * | 11/1991 | Castellano et al. | 370/536 |
| RE33,900 E | 4/1992 | Howson | |
| 5,243,600 A * | 9/1993 | Mori et al. | 370/536 |
| 5,293,562 A | 3/1994 | Pope | |
| 5,642,359 A | 6/1997 | Nassehi | |
| 5,970,067 A * | 10/1999 | Sathe et al. | 370/394 |
| 6,021,124 A * | 2/2000 | Haartsen | 370/336 |
| 6,081,527 A * | 6/2000 | Chappel et al. | 370/394 |
| 6,574,191 B1 * | 6/2003 | Usukura et al. | 370/216 |
| 6,580,688 B1 * | 6/2003 | Klink | 370/220 |
| 6,598,229 B2 * | 7/2003 | Smyth et al. | 725/107 |
| 6,788,686 B1 * | 9/2004 | Khotimsky et al. | 370/394 |
| 6,891,794 B1 * | 5/2005 | Hughes | 370/225 |
| 6,965,533 B2 * | 11/2005 | Sakata et al. | 365/202 |
| 7,027,390 B2 * | 4/2006 | Wakai et al. | 370/218 |
| 7,394,766 B2 * | 7/2008 | Drottar et al. | 370/238 |
| 2002/0018452 A1 * | 2/2002 | Cha | 370/329 |

* cited by examiner

*Primary Examiner*—Chi H Pham
*Assistant Examiner*—Warner Wong

(57) ABSTRACT

A method an apparatus of communicating data, such as in a sending node or a receiving node of networked system, includes transmitting via a network connection having at least M data channels at least one data block, the data block having M data bits having an original data bit order, in a full transmission bit order at a full data block transmission rate via a full network data path comprising M functioning data channels. The method and apparatus further includes transmitting the at least one data block in a degraded transmission bit order at a degraded data block transmission rate via a selected degraded network data path comprising at least one, but less than M, functioning data channels.

31 Claims, 10 Drawing Sheets

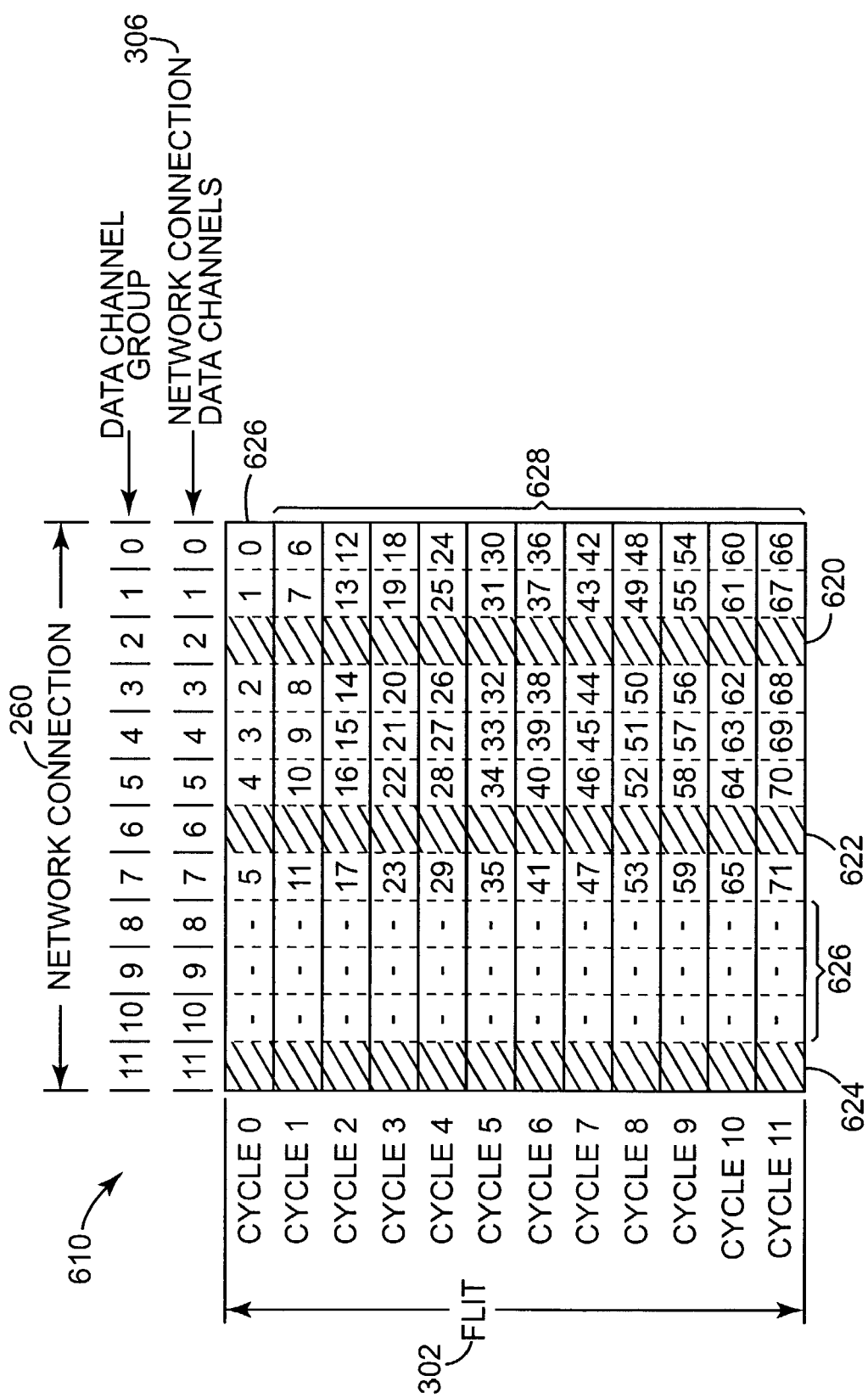

DEGRADABLE NETWORK DATA PATH TRANSMISSION SCHEME

THE FIELD OF THE INVENTION

The present invention relates generally to data communication systems, and more particularly to networked systems transmitting data between distributed nodes via a reliable network connection.

BACKGROUND OF THE INVENTION

Networked systems transmit data between distributed nodes via some form of network connection. Unfortunately, these network connections can be unreliable and sometimes introduce errors to the transmitted data. Network connections typically comprise physical links which form data channels. Link failures constitute a significant portion of data transmission errors in networked systems and are typically of three types: (1) transient, (2) intermittent, and (3) permanent. Transient failures are due to various effects such as noise, alpha particle hits, and vibration. Intermittent and permanent failures may be caused by one or more faulty wires in the link, a loose link connection, or some other physical link failure.

In order to overcome these link failures, networked systems typically utilize some type of error correcting code (ECC) technique. ECC techniques can correct certain errors that occur during data transmission over a network connection. Many types of ECC techniques are available, and one commonly employed ECC technique is a single error correction code utilizing a Hamming code.

In one traditional single error correcting code technique utilizing a Hamming code, a sending node employs a first logical function to calculate parity bits from the data bits and appends the parity bits to the data bits prior to transmission. The data bits and their associated parity bits are then transmitted in a predetermined configuration to a receiving node via the network connection. The receiving node then employs the first logical function to calculate the parity bits from the received data bits and compares the calculated parity bits to the received parity bits. A mismatch between one of the calculated parity bits and its corresponding received parity bit indicates a data bit error, and the receiving node can identify and correct the data bit that is in error.

Unfortunately, as its name implies, the error correcting capability of this single error correction code technique is limited to situations where only one bit of a transmitted data block is in error. While this ECC technique can detect the presence of multi-bit errors, it cannot correct them, and events creating such link failures will cause a networked system to malfunction. Thus, where two or more links of a network connection fail, a networked system utilizing a single error correcting code scheme will typically be able to detect the error but not correct it, which typically results in a system malfunction.

Many networked systems would benefit from a transmission scheme that provides continued reliable data transmission in the presence of multiple-bit link failures.

SUMMARY OF THE INVENTION

One aspect of the present invention provides a method of communicating data. The method includes transmitting via a network connection having at least M data channels at least one data block, the data block having M data bits having an original data bit order, in a full transmission bit order at a full data block transmission rate via a full network data path comprising M functioning data channels. The method further comprises transmitting the at least one data block in a degraded transmission bit order at a degraded data block transmission rate via a selected degraded network data path comprising at least one, but less than M, functioning data channels.

One aspect of the present invention provides a sending node including a buffer configured to receive at least one data block having M data bits in an original bit order, and a multiplexer module. The multiplexer module is coupled to the buffer and adapted to coupled to a network connection having at least M data channels to form a full network data path comprising M functioning data channels. The multiplexer module is also configured to receive the at least one data block and to receive a status signal indicative of functioning and non-functioning data channels. The multiplexer module is also configured to provide the at least one data block in a full transmission bit order via the full network data path at a full data block transmission rate, and to provide the at least one data block in a degraded transmission bit order via a selected degraded network data path comprising at least one, but less than M, functioning data channels.

One aspect of the present invention provides a receiving node comprising a staging module and a multiplexer module. The staging module is adapted to couple to a network connection having at least M data channels to form a full network data path comprising M functioning data channels, and is configured to receive at least one data block at a full data block transmission rate in a full transmission bit order via the full network data path. The staging module is also configured to receive the at least one data block at a degraded data block transmission rate in a degraded transmission bit order via a selected degraded network data path comprising at least one, but less than M, functioning data channels. The multiplexer module is coupled to the staging module and is configured to receive the at least one data block and to receive a status signal indicative of functioning and non-functioning data channels, and is configured to provide the at least one data block in an original bit order.

One aspect of the present invention provides a networked system comprising a networked connection comprising at least M data channels, a sending node coupled to the networked connection to form a full network data path having M functioning data channels, and a receiving node coupled to the network connection. The sending node comprises a buffer configured to receive at least one data block having M data bits in an original bit order, and a multiplexer module configured to receive the at least one data block and a status signal indicative of functioning and non-functioning data channels. The multiplexer module is further configured to provide the at least one data block in a full transmission bit order at a full data block transmission rate via the full network data path, and to provide the at least one data block in a degraded transmission bit order at a degraded data block transmission rate via a selected degraded network data path comprising at least one, but less than M data channels.

The receiving node comprises a staging module configured to receive the at least one data block from the sending node, and a multiplexer module configured to receive the status signal and to provide the at least one data block in the original data bit order.

BRIEF DESCRIPTION OF THE DRAWINGS

FIG. 10 is an illustrative diagram of an example flit being transmitted via a degradable network data path according to one embodiment of the present invention.

DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
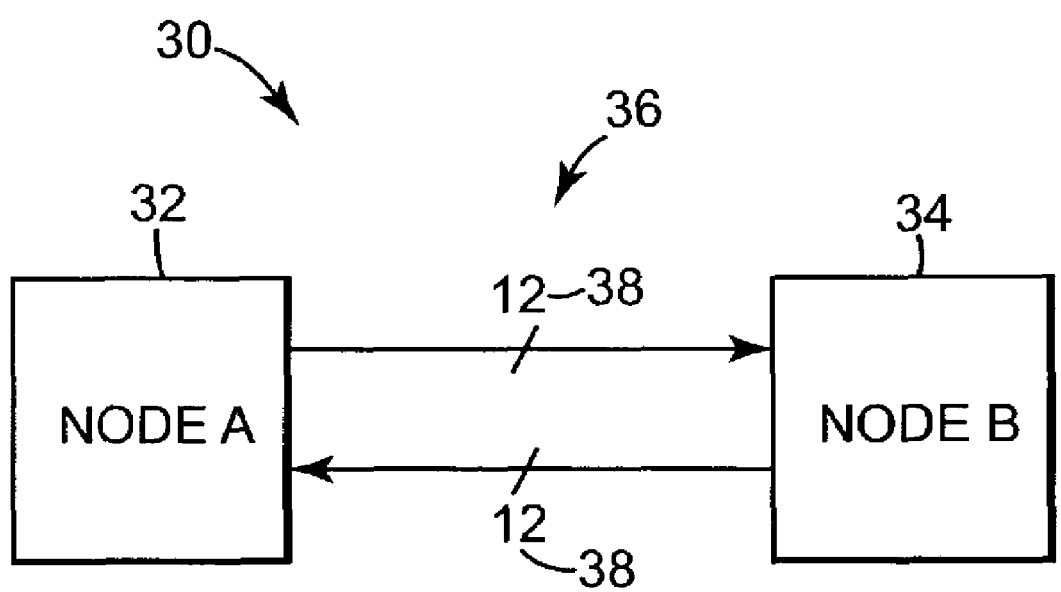
FIG. 1 is a block diagram of a networked system.

A networked system is illustrated generally at 30 in block diagram form in FIG. 1. Networked system 30 includes a node A indicated at 32 and a node B indicated at 34. Networked system 30 has the implicit ability to communicate data between node A indicated at 32 and node B indicated at 34 via a network connection 36. Network connection 36 can be of any suitable type of connection including, but not limited to, a local area network (LAN) connection; a bus connection; a telephone line/modem connection; a direct wireless connection; an internet connection; and/or an intranet connection. Network connection 36 comprises one-bit wide data channels, or links, to thereby form a data path having a bit-width equal to the number of data channels. For illustrative purposes, the example network connection 36 comprises 12 one-bit data channels 38 that form a 12-bit wide two-way communication path between node A indicated at 32 and node B indicated at 34 which can transmit 12-bits of data per cycle via network connection 36.

Unfortunately, network connections, such as network connection 36, are subject to link failures which can introduce errors that can corrupt transmitted data. Link failures are typically of three types: (1) transient, (2) intermittent, and (3) permanent. Transient errors are caused by various effects including, but not limited to, noise, alpha particle hits, and vibration. Intermittent and permanent errors may be caused by one or more faulty physical links, such as a broken wire or a wire having a loose connection. Link failures account for a significant portion of system errors. In efforts to overcome link errors, networked systems typically employ some form of error correction code (ECC) technique.

As discussed in the Background of Invention section of the present specification, an example of one form of ECC is a single error correcting code (SECC), such as a Hamming code. ECC is an extension of the parity concept. In a typical ECC system, a sending node employs a first logical function to calculate multiple ECC bits for a block of data bits that is to be transmitted, with each bit being calculated as the parity bit for a different subset of data bits of the block. Typically, one ECC bit is calculated for each byte of the data block. For example, eight ECC bits are typically required for a sixty-four bit data block. After calculating the ECC bits for the data block subsets, the sending node combines the data block bits and the ECC bits in a prearranged order to form a flit. In the case of a sixty-four bit data block, the flit comprises a total of 72-bits. The sending node then transfers the flit to a receiving node via a network connection.

Upon receiving the transmitted flit, the receiving node employs the first logical function to compute ECC bits for the received data block of the transmitted flit and compares the calculated ECC bits to the transmitted ECC bits. Any discrepancy between the calculated and transmitted ECC bits indicates an error. In such an ECC system, each data bit is a typically a member of more than one subset of data bits, and thus each data bit contributes to the calculation of more than one ECC bit. As a result, by identifying the mismatched bits between the calculated and received ECC bits, the receiving node can detect a single bit error and identify which bit is in error. The receiving node can then correct the bit identified as being in error.

Figure 2A:
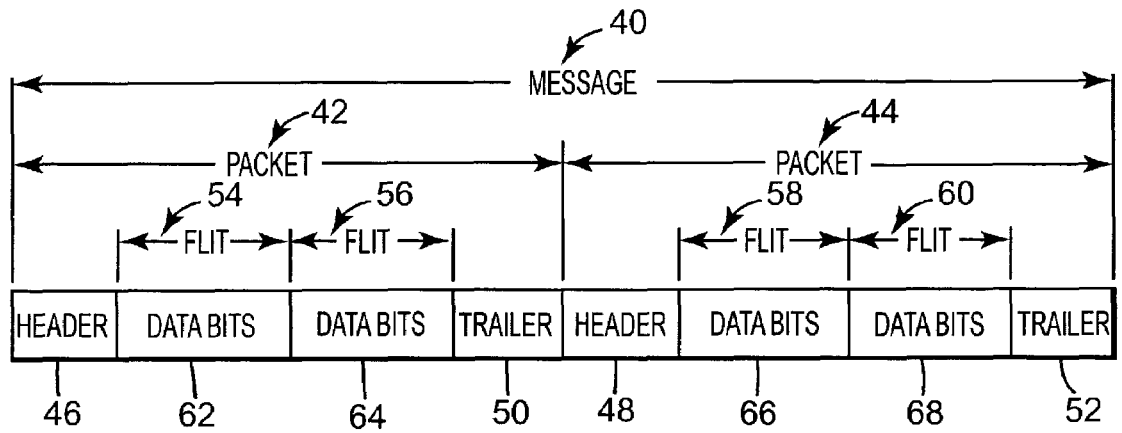
FIG. 2A is an illustrative diagram of an example packetized message configuration for physically transmitting data messages in a networked system.

FIG. 2A is an illustrative diagram of an example message configuration 40 for physically transmitting data between network system nodes, such as between nodes A indicated at 32 and node B indicated at 34 of networked system 30. Data is typically communicated between nodes in the form of a message, such as represented by example message configuration 40. A message is herein defined to be an application-defined unit of data exchange between nodes. Messages are typically organized in packets, such as packets 42 and 44, for physically transmitting the message between nodes. A packet is herein defined to be a unit of data encapsulated between a network protocol header and/or trailer, such as headers 46 and 48, and trailers 50 and 52. Each packet further comprises units of data, herein referred to as flits, as indicated by flits 54, 56, 58, and 60. In a networked system employing an ECC scheme, the ECC bits are incorporated into each flit along with the data bits indicated at 62, 64, 66, and 68.

Figure 2B:
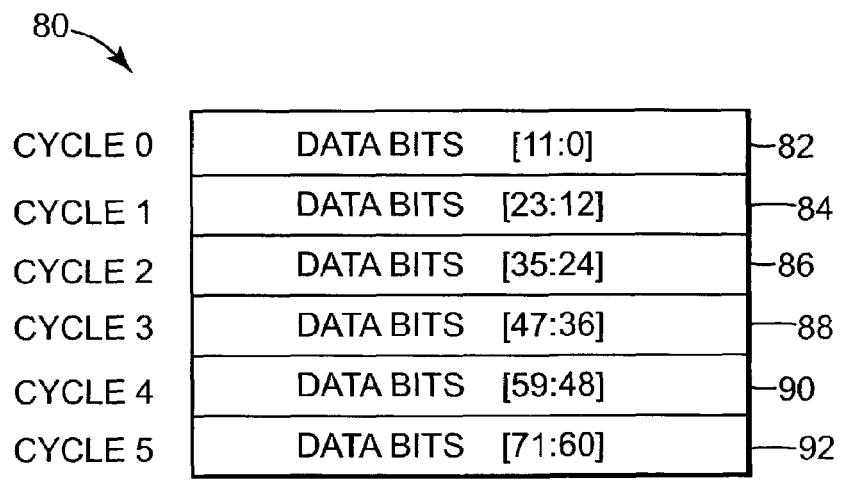
FIG. 2B is an illustrative diagram of an example flit configuration.

FIG. 2B is an illustrative diagram of an example flit configuration 80 for networked system 30 of FIG. 1. In the illustrative example configuration of FIG. 2B, flits 80 for networked system 30 each comprise 72 bits, and node A indicated at 32 and node B indicated at 34 can transmit 12 bits of data per cycle via network connection 36. The present invention described below can, however, apply to any suitable flit configuration, data block size, and transfer rate. In the illustrative example of FIG. 2B, six cycles are required for node A indicated at 32 to transmit flit 80 to node B indicated at 34 via network connection 36. Thus, for example, data bits 0-11 indicated at 82 are transmitted at cycle 0; data bits 12-23 indicated at 84 are transmitted at cycle 1; data bits 24-35 indicated at 86 are transmitted at cycle 2, data bits 36-47 indicated at 88 are transmitted at cycle 3; data bits 48-59 indicated at 90 are transmitted at cycle 4;, and data bits 60-71 indicated at 92 are transmitted at cycle 5. In an example networked system 30 employing an ECC scheme, eight of the 72 bits of flit 80 are ECC bits.

While a traditional ECC schemes, such as an SEC scheme, are capable of correcting one bit of a flit, or other application-defined unit of data, traditional ECC schemes can correct only a defined number of bits (e.g., typically only one bit can be corrected) and are thus unable to correct events where more than the defined number of bits (e.g., one bit) in the flit is in error. An example of an event causing such an error is where two or more one-bit wide data channels of a network connection simultaneously suffer from an intermittent or permanent failure. A traditional SECC scheme is capable only of detecting such multi-channel failures, not correcting for them. Consequently, a multi-channel failure, or other failure not supported by the ECC scheme, will cause a networked system to malfunction. The below described degradable network data path transmission scheme of the present invention can provide improved networked system connection reliability by continuing to transmit data via functioning data channels after multiple data channels have failed.

Figure 3:
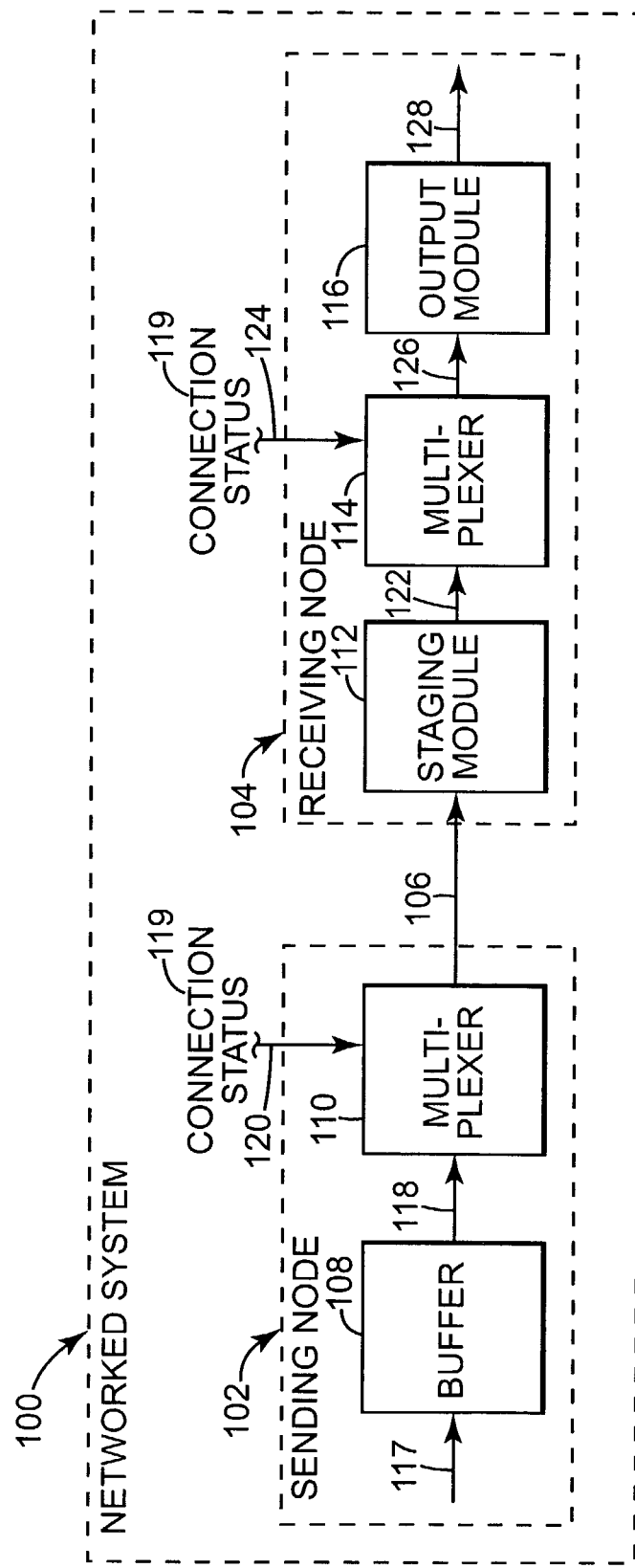
FIG. 3 is an block diagram illustrating one embodiment of a network system according to the present invention.

FIG. 3 is a block diagram illustrating one embodiment of a networked system 100 according to the present invention. Networked system 100 includes a sending node 102 and a receiving node 104, and a network connection 106. Sending node 102 includes a buffer 108 and a multiplexer 110. Receiving node 104 includes a staging module 112, a multiplexer 114, and an output module 116. Network connection 106 can be any suitable type of connection including, but not limited to, a local area network (LAN) connection; a bus connection; a telephone line/modem connection; a direct wireless connection; and/or an internet connection.

Buffer 108 receives, via a path 117, at least one data block having M data bits in an original data bit order and provides the at least one data block to multiplexer 110, via a path 118. Multiplexer 110 is coupled to network connection 106, comprising at least M data channels, to form a full network data path comprising M functioning data channels, and receives a status signal 119, via a line 120, indicative of functioning and non-functioning data channels of network connection 106.

When each of the M channels of the full network data path of network connection 106 are functioning, multiplexer 110 provides the at least one data block in a full transmission bit order at a full data block transmission rate via the full network data path to receiving node 104. When at least one of the M data channels is not functioning, multiplexer 110 provides the at least one data block in a degraded transmission bit order at a degraded data block transmission rate via a selected degraded network data path comprising at least one, but less than M, functioning data channels of network connection 106.

Staging module 112 is coupled to network connection 106, and receives the at least one data block from sending node 102 in either the full transmission bit order at the fill data block transmission rate or in a degraded transmission bit order at a degraded data block transmission rate. Multiplexer 114 is coupled to staging module 112 via a path 122, and receives the connection status signal 119 indicative of the functioning and non-functioning data channels network connection 106 via a line 124. Multiplexer 114 receives the at least one data block from staging module 112 via path 122 and provides the at least one data block in the original data bit order to output module 116 via a path 126. Output module holds the at least one data block and transfers it in the original data bit order on path 128 to a buffer or a networked system 100 process running on receiving 104 that can begin working with the data.

Figure 4:
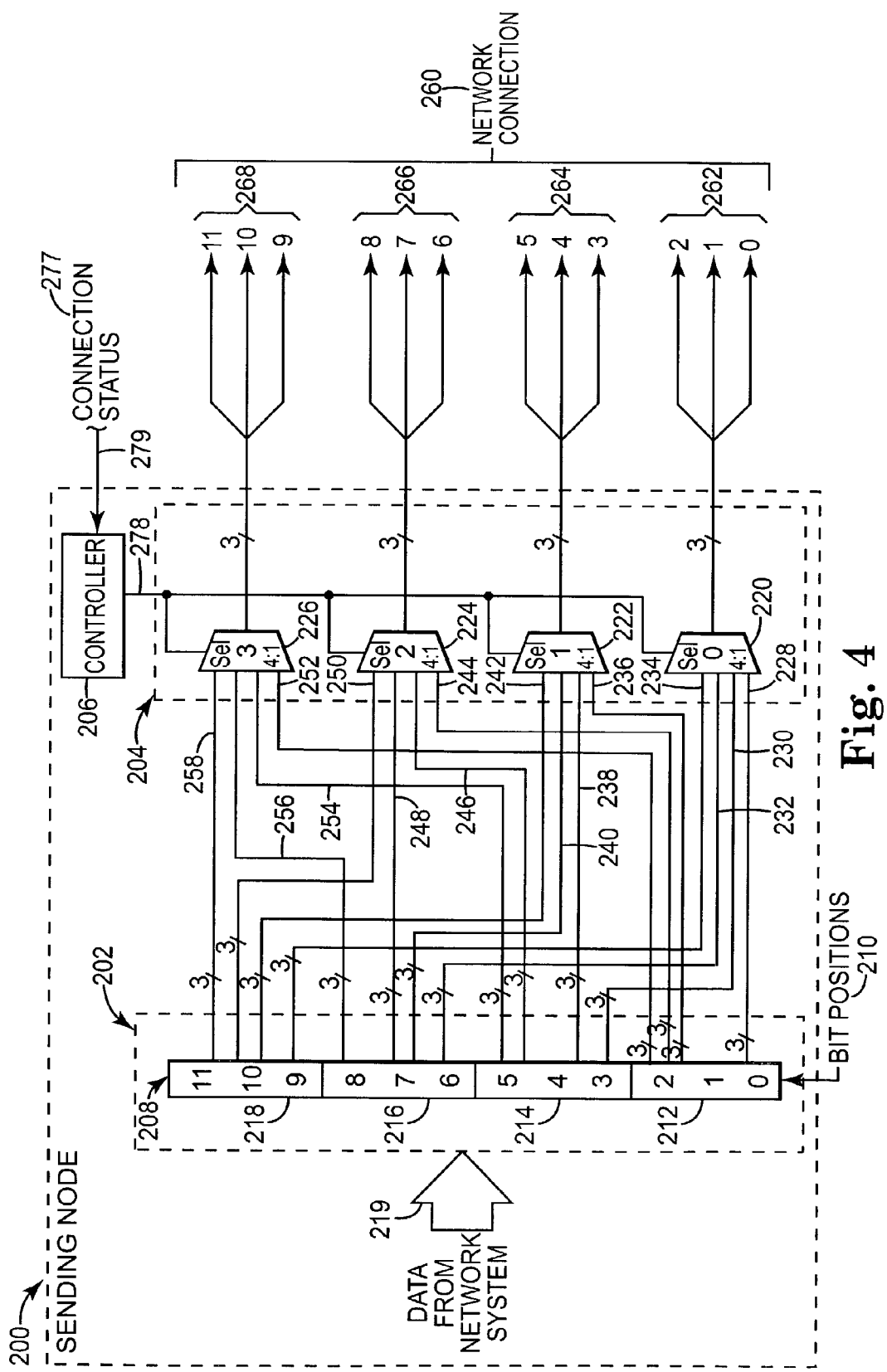
FIG. 4 is a block and schematic diagram of one embodiment of a sending node according to the present invention.

FIG. 4 is an illustrative block and schematic diagram of an example embodiment of a sending node 200 according to the present invention. Sending node 200 includes a buffer 202, a multiplexer module 204, and a controller 206. In the example embodiment of FIG. 4, example sending node 200 can transmit twelve bits per cycle. The present invention described below can, however, apply to sending nodes capable of transmitting data at any suitable data rate.

Buffer 202 comprises a 12-bit register 208 having bit positions 0-11 as indicated at 210. Bit positions 0-11, indicated at 210 of register 208 are segregated into four three-bit groups with a first group 212 comprising bit positions 0-2, a second group 214 comprising bit positions 3-5, a third group 216 comprising bit positions 6-8, and a fourth group 218 comprising bit positions 911. Register 208 is configured to receive a series of 12-bit data blocks from a path 219, with each data block having an original bit order corresponding to bit positions 0-11 of register 208, as indicated at 210.

Mulitplexer module 204 comprises four 4-to-1 multiplexers 220, 222, 224, and 226. Each of the four multiplexers 220, 222, 224, and 226 has four inputs and is coupled to each of the four three-bit groups of buffer register 208. Multiplexer 220 is coupled to first three-bit group 212, second group 214, third group 216, and to fourth group 218 via three-bit wide data channels 228, 230, 232, and 234, respectively. Multiplexer 222 is coupled to first three-bit group 212, second group 214, third group 216, and fourth group 218 via three-bit wide data paths 236, 238, 240, and 242, respectively. Multiplexer 224 is coupled to first 3-bit group 212, second group 214, third group 216, and fourth group 218 by three-bit wide data paths 244, 246, 248, and 250, respectively. Multiplexer 226 is coupled to first three-bit group 212, second group 214, third group 216, and fourth group 218 via three-bit wide data paths 252, 254, 256, and 258, respectively.

Additionally, the output of each of the four multiplexers of multiplexer 204 is coupled to a network connection 260 having at least twelve data channels to form four three-bit data channel groups, with a first data channel group 262 comprising data channels 0-2, a second data channel group 264 comprising data channels 3-5, a third data channel group 266 comprising data channels 6-8, and a fourth data channel group 268 comprising data channels 9-11. The output of multiplexer 220 is coupled to first data channel group 262, the output of multiplexer 222 is coupled to second data channel group 264, the output of multiplexer 224 is coupled to third data channel group 266, and the output of multiplexer 226 is coupled to fourth data channel group 268.

Controller 206 receives a status signal 277, via a line 279, indicative of functioning and non-functioning data channels 0-11 of network connection 260. Controller 206 provides a control signal on a line 278 to a selector input of multiplexer 220, a selector input of multiplexer 222, a selector input of multiplexer 224, and a selector input of multiplexer 226.

FIGS. 5, 6, 7 and 8 described below are illustrative examples of sending node 200 of FIG. 4 transmitting an example flit 302 via a degradable network data path of network connection 260 comprising twelve data channels, labeled as data channels 0-11 as indicated at 306. Each one of FIGS. 5, 6, 7, and 8 illustrates an example transmission scenario with varying numbers of functioning data channels. In each of the FIGS. 5-8, network connection 260 and data channel groups 0-3, indicated respectively at 262, 264, 266, and 268, correspond respectively, to network connection 260 and data groups 262, 264, 266, and 268 of FIG. 4. Flit 302 comprises 72 data bits labeled as 0-71.

Figure 5:
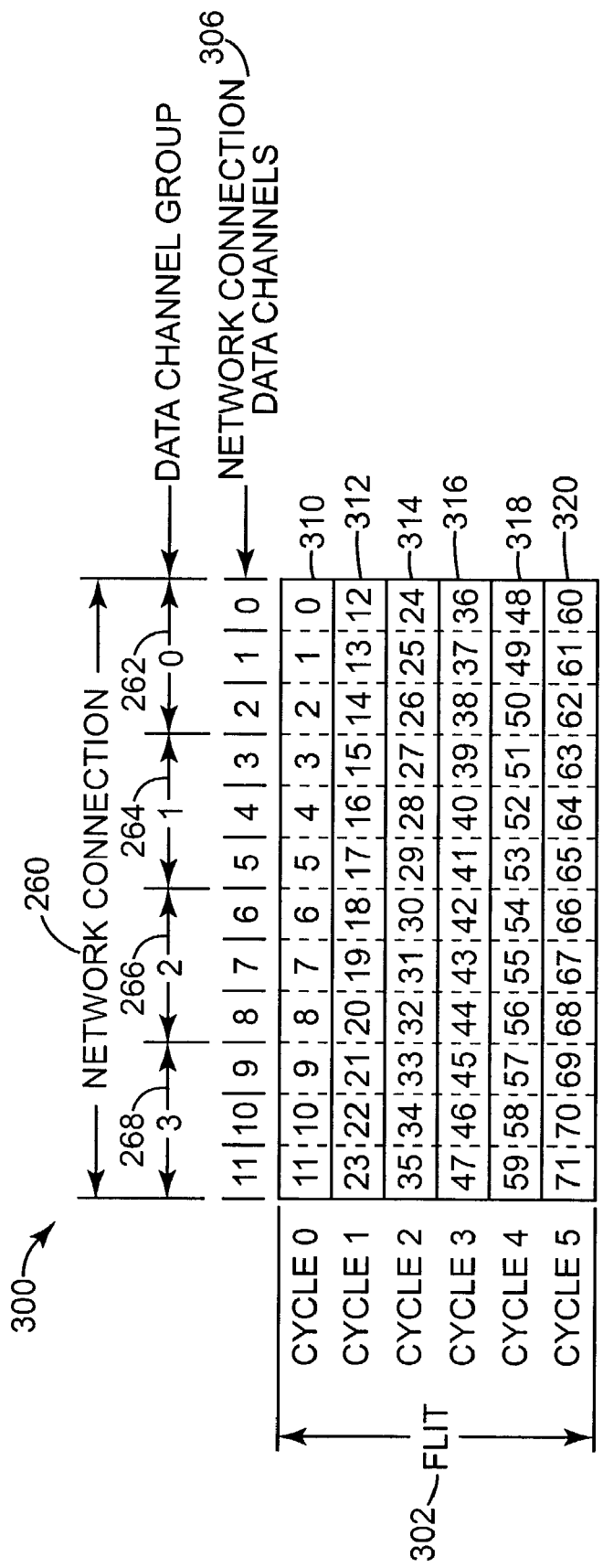
FIG. 5 is an illustrative diagram of an example flit being transmitted via a degradable network data path according to one embodiment of the present invention.

FIG. 5 is an illustrative diagram of an example transmission scenario 300 where sending node 200 of FIG. 4 transmits example flit 302 via a full network data path of network connection 260 when all data channels 0-11, indicated at 306, are functioning. Controller 206 receives status signal 277 indicating that each of the data channels 0-11 of network connection 260 are functioning. As indicated at 310, during cycle 0, controller 206 instructs multiplexer 220 via selector line 278 to receive data bits 0-2 via three-bit data path 228; instructs multiplexer 222 via selector line 278 to receive data bits 3-5 via three-bit data path 238; instructs multiplexer 224 via selector line 278 to receive data bits 6-8 via three-bit data path 248; and instructs multiplexer 226 via selector line 278 to receive data bits 9-11 via three-bit data path 258. Multiplexer 220 transmits data bits 0-2 via data channels 0-2 of data channel group 0 indicated at 262. Multiplexer 222 transmits data bits 3-5 via data channels 3-5 of data channel group 1 indicated at 264. Multiplexer 224 transmits data bits 6-8 via data channels 6-8 of data channel group 2 as indicated at 266. Multiplexer 226 transmits data bits 9-11 via data channels 9-11 of data channel group 3 as indicated at 268.

The remaining data bits are transmitted in a similar manner, with bits 12-23, indicated at 312, being transmitted at a cycle 1; bits 24-35, indicated at 314, being transmitted at a cycle 2; bits 36-47, indicated at 316, being transmitted at a cycle 3; bits 48-59, indicated at 318, being transmitted at a cycle 4; and bits 60-71, indicated at 320, being transmitted at a cycle 5. Thus, when all data channels 0-11 are functioning, sending node 200 transmits the 72-bits of data of flit 302 via the full network data path of network connection 260 in six cycles.

Figure 6:
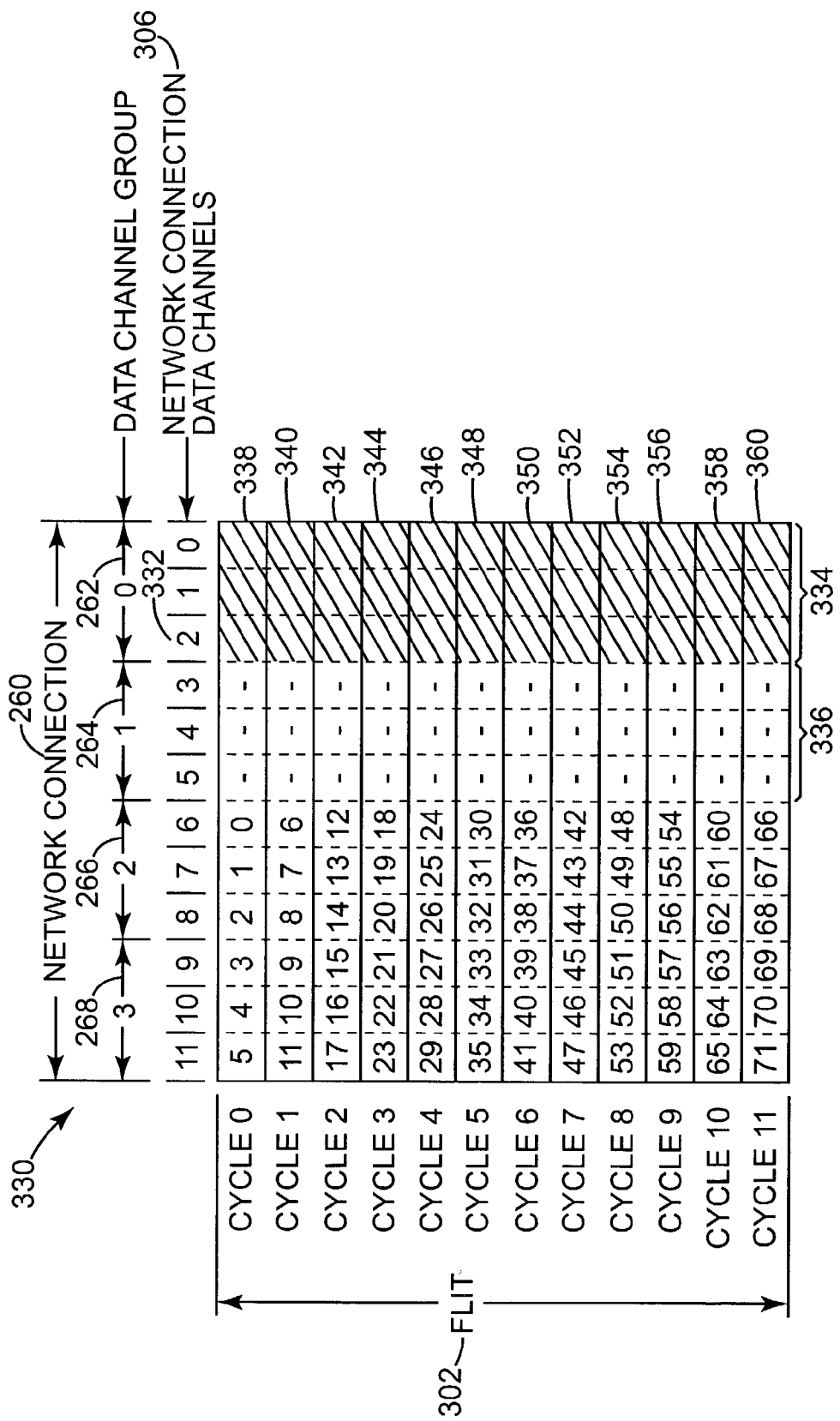
FIG. 6 is an illustrative diagram of an example flit being transmitted via a degradable network data path according to one embodiment of the present invention.

FIG. 6 is an illustrative diagram of an example transmission scenario 330 where sending node 200 of FIG. 4 transmits example flit 302 via a degraded network data path of network connection 260 when one data channel of the network connection data channels 0-11, indicated at 306, is not functioning. In example transmission scenario 330, the non-functioning data channel is data channel 2, indicated at 332. Nevertheless, the illustration of FIG. 6 can be adapted to other transmission scenarios where the non-functioning data channel is a data channel other than data channel 2.

Controller 206 receives status signal 277 indicating that data channel 2 of the data channels 0-11 of network connection 260, as indicated at 332, is not functioning. Controller 206 removes data channel group 0 from operation, as indicated by hatched lines 334, and places data channel group 1 into a "standby" mode, as indicated by dashes 336, by instructing multiplexers 220 and 222 via selector line 278 to not receive data. As indicated at 338, during cycle 0, controller 206 instructs multiplexer 224 via selector line 278 to receive data bits 0-2 from buffer register 208 via three-bit data path 244, and instructs multiplexer 226 via selector line 278 to receive data bits 3-5 from buffer register 208 via three-bit data path 254. Multiplexer 224 transmits data bits 0-2 via three-bit data path 274 of data channel group 2, and multiplexer 226 transmits data bits 3-5 via three-bit data path 276 data channel group 3.

As indicated at 340, during cycle 1, controller 206 instructs multiplexer 224 via selector line 278 to receive data bits 6-8 from buffer register 208 via three-bit data path 248, and instructs multiplexer 226 via selector line 278 to receive data bits 9-11 from buffer register 208 via three-bit data path 258. Multiplexer 224 transmits data bits 6-8 via three-bit data channel 274 of data channel group 2, and multiplexer 226 transmits data bits 9-11 via three-bit data path 276 of data channel group 3.

The remaining data bits are transmitted in a similar manner, with bits 12-17, indicated at 342, being transmitted at a cycle 2; bits 18-23, indicated at 344, being transmitted at a cycle 3; bits 24-29, indicated at 346, being transmitted at a cycle 4; bits 30-35, indicated at 348, being transmitted at a cycle 5; bits 36-41, indicated at 350, being transmitted at a cycle 6; bits 42-47, indicated at 352, being transmitted at cycle 7; bits 48-53, indicated at 354, being transmitted at cycle 8; bits 54-59, indicated at 356, being transmitted at cycle 9; bits 60-65, indicated at 358, being transmitted at cycle 10; and bits 66-71, indicated at 360, being transmitted at cycle 11. Thus, when one data channel of the data channels 0-11 of network connection 260 is not functioning, sending node 200 transmits the 72-bits of data of flit 302 via the degraded network data path of network connection 260 in twelve cycles.

Figure 7:
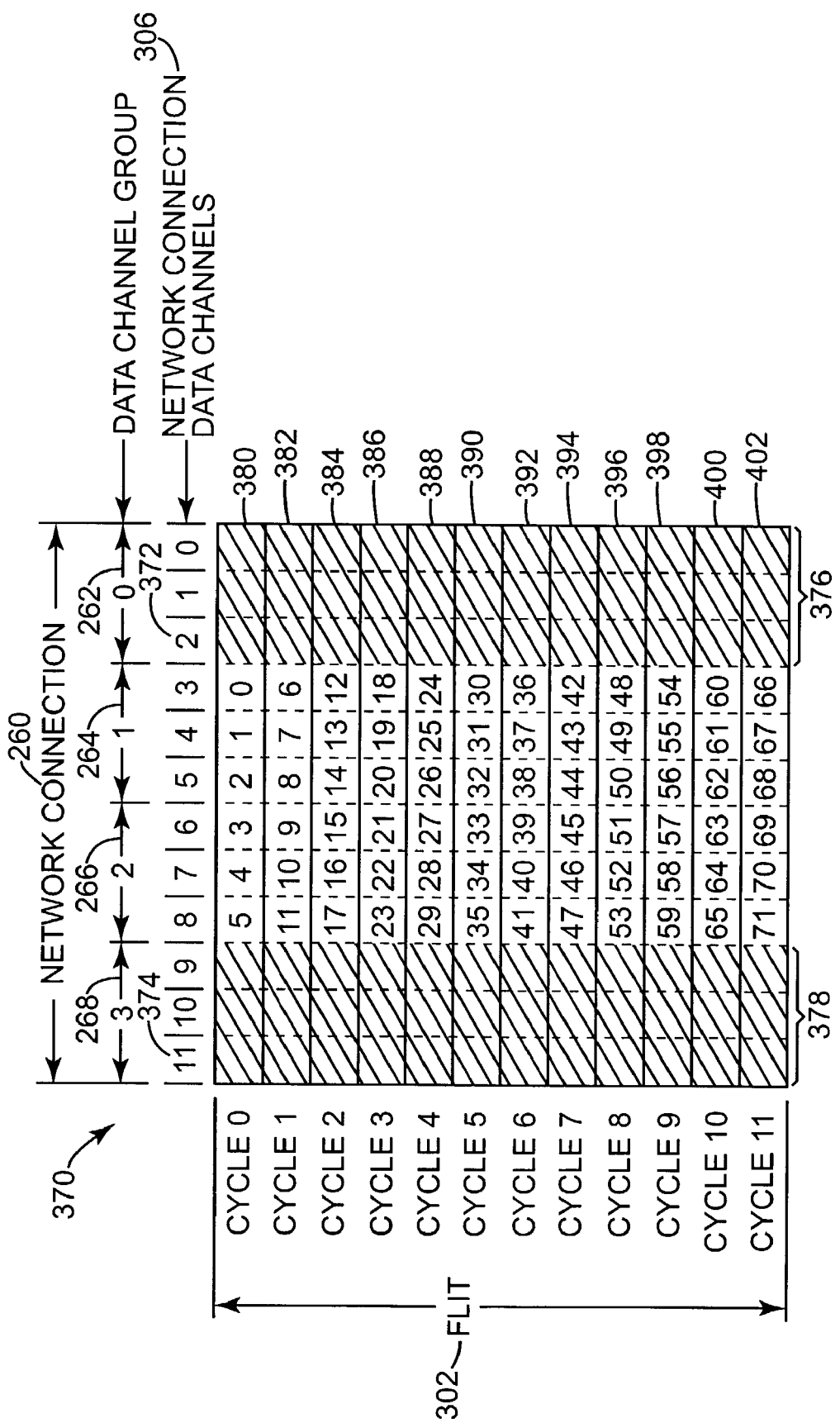
FIG. 7 is an illustrative diagram of an example flit being transmitted via a degradable network data path according to one embodiment of the present invention.

FIG. 7 is an illustrative diagram of an example transmission scenario 370 where sending node 200 of FIG. 4 transmits example flit 302 via a degraded network data path of network connection 260 where two data channels of the network connection data channels 0-11, indicated at 306, are not functioning. In example transmission scenario 370, the non-functioning data channels are data channel 2, indicated at 372, and data channel 11, indicated at 374. Nevertheless, the illustration of FIG. 7 can be adapted to other transmission scenarios where the two non-functioning data channels are data channels other than data channels 2 and 11.

Controller 206 receives a status signal 277 indicating that data channels 2 and 11 of the data channels 0-11 of network connection 260, respectively indicated at 372 and 374, are not functioning. Controller 206 removes data channel groups 0 and 3 from operation, as indicated by hatched lines 376 and 378, by instructing mulitplexers 220 and 226, via selector line 278, to not receive data. As indicated at 380, during 0, controller 206 instructs multiplexer 222 via selector line 278 to receive data bits 0-2 from buffer register 208 via three-bit data path 236; and instructs multiplexer 224 via selector line 278 to receive data bits 3-5 from buffer register 208 via three-bit data path 246. Multiplexer 222 transmits data bits 0-2 via three-bit data path 272 of data channel group 1, and multiplexer 224 transmits data bits 3-5 via three-bit data path 274 of data channel group 2.

As indicated at 382, during cycle 1, controller 206 instructs multiplexer 222 via selector line 278 to receive data bits 6-8 from buffer register 208 via three-bit path 240, and instructs multiplexer 224 to receive data bits 9-11 from buffer register 208 via three-bit data path 250. Multiplexer 222 transmits data bits 6-8 via three-bit data path 272 of data channel group 1, and multiplexer 224 transmits data bits 9-11 via three-bit data path 274 of data channel group 2.

The remaining data bits are transmitted in a similar manner, with bits 12-17, indicated at 384, being transmitted at a cycle 2; bits 18-23, indicated at 386, being transmitted at a cycle 3; bits 24-29, indicated at 388, being transmitted at a cycle 4; bits 30-35, indicated at 390, being transmitted at a cycle 5; bits 36-41, indicated at 392, being transmitted at a cycle 6; bits 42-47, indicated at 394, being transmitted at cycle 7; bits 48-53, indicated at 396, being transmitted at cycle 8; bits 54-59, indicated at 398, being transmitted at cycle 9; bits 60-65, indicated at 400, being transmitted at cycle 10; and bits 66-71, indicated at 402, being transmitted at cycle 11. Thus, when two data channels of the data channels 0-11 of network connection 260 are not functioning, sending node 200 transmits the 72-bits of data of flit 302 via the degraded network data path of network connection 260 in 12 cycles.

Figure 8:
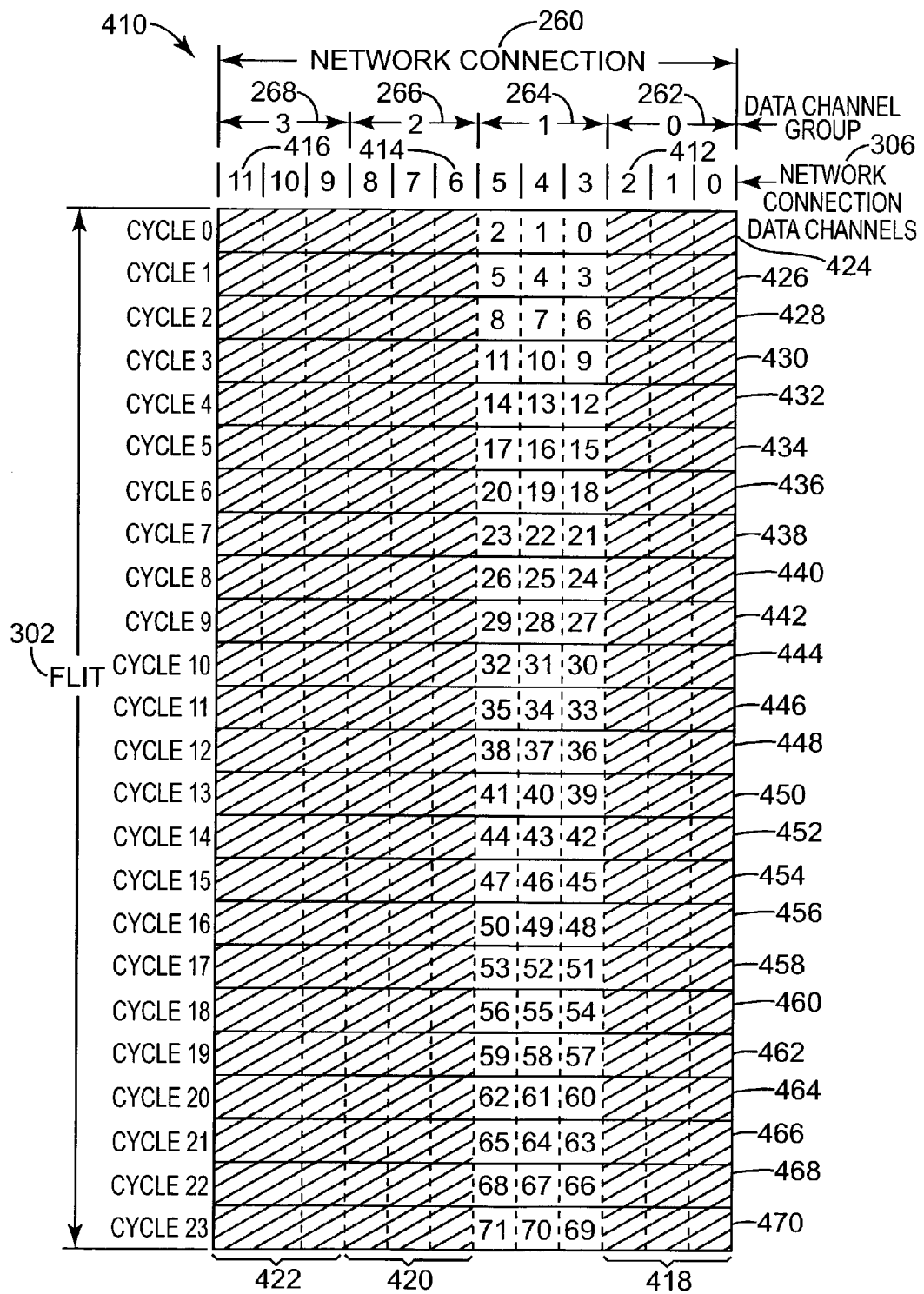
FIG. 8 is an illustrative diagram of an example flit being transmitted via a degradable network data path according to one embodiment of the present invention.

FIG. 8 is an illustrative diagram of an example transmission scenario 410 where sending node 200 of FIG. 4 transmits example flit 302 via a degraded network data path of network connection 260 when three data channels of network connection data channels 0-11, indicated at 260 are not functioning. In example transmission scenario 410, the non-functioning data channels are data channels 2, 6, and 11, indicated at 412, 414, and 416, respectively. Nevertheless, the illustration of FIG. 8 can be adapted to other transmission scenarios where the three non-functioning data channels are data channels other than data channels 2, 6, and 11.

Controller 206 receives status signal 277 indicating that data channels 2, 6, and 11, indicated respectively at 412, 414 and 416, are not functioning. Controller 206 removes data channel groups 0, 2, and 3 from operation, as indicated by hatched lines at 418, 420 and 422, by instructing mulitplexers 220, 224, and 226, via selector line 278, to not receive data. As indicated at 424, during cycle 0, controller 206 instructs multiplexer 222 via selector line 278 to receive data bits 0-2 from buffer register 208 via three-bit data path 236; and to transmit data bits 0-2 via three-bit data path 272 of data channel group 1. As indicated at 426, during cycle 1, controller 206 instructs multiplexer 222 via selector line 278 to receive data bits 3-5 from buffer register 208 via three-bit data path 238; and to transmit data bits 3-5 via three-bit data path 272 of data channel group 1. As indicated at 428, during cycle 2, controller 206 instructs multiplexer 222 via selector line 278 to receive data bits 6-8 from buffer register 208 via three-bit data path 240; and to transmit data bits 6-8 via three-bit data path 272 of data group 1. As indicated at 430, during cycle 3, controller 206 instructs multiplexer 222 via selector line 278 to receive data bits 9-11 from buffer register 208 via three-bit data path 242; and to transmit data bits 9-11 via three-bit data path 272 and data channel group 1.

The remaining data bits are transmitted in a similar manner, with bits 12-14, indicated at 432, being transmitted at a cycle 4,; bits 15-17, indicated at 434, being transmitted at a cycle 5; bits 18-20, indicated at 436, being transmitted at a cycle 6; bits 21-23, indicated at 438, being transmitted at a cycle 7; bits 24-26, indicated at 440, being transmitted at a cycle 8; bits 27-29, indicated at 442, being transmitted at cycle 9; bits 30-32, indicated at 444, being transmitted at cycle 9; bits 33-35, indicated at 446, being transmitted at cycle 11; bits 36-38, indicated at 448, being transmitted at cycle 12; bits 39-41, indicated at 450, being transmitted at cycle 13; bits 42-44, indicated at 452, being transmitted at cycle 14; bits 45-47, indicated at 454, being transmitted at cycle 15; bits 48-50, indicated at 456, being transmitted at cycle 16; bits 51-53, indicated at 458, being transmitted at cycle 17; bits 54-56, indicated at 460, being transmitted at cycle 18; bits 57-59, indicated at 462, being transmitted at cycle 19; bits 60-62, indicated at 464, being transmitted at cycle 20; bits 63-65, indicated at 466, being transmitted at cycle 21; bits 66-68, indicated at 468, being transmitted at cycle 22; and bits 69-71, indicated at 470, being transmitted at cycle 23. Thus, when three data channels of the data channels 0-11 of network connection 260 are not functioning, sending node 200 transmits the 72-bits of data of flit 302 via the degraded network data path of network connection 260 in 24 cycles.

Figure 9:
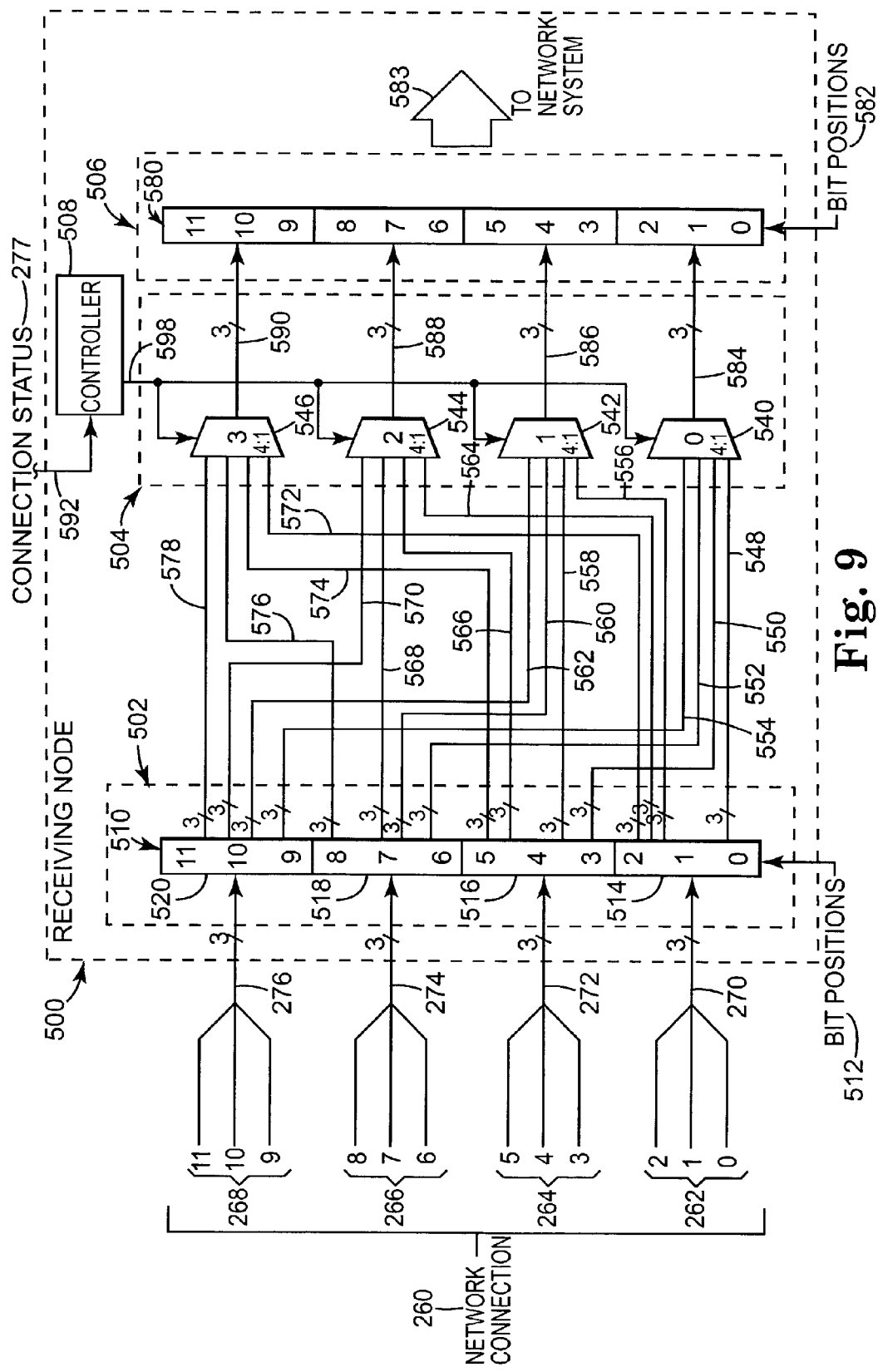
FIG. 9 is a block and schematic diagram of one embodiment of a receiving node according to the present invention.

FIG. 9 is an illustrative block and schematic diagram of an example embodiment of a receiving node 500 according to the present invention. Receiving node 500 includes a staging module 502, a multiplexer 504, an output module 506, and a controller 508. In the example embodiment of FIG. 9, example receiving node 500 can receive twelve data bits per cycle. The present invention described below can, however, apply to receiving nodes capable of receiving data at suitable data rate.

Staging module 502 comprises a 12-bit register 510 having bit positions zero 0-11, as indicated at 512. Bit positions 0-11, indicated at 512, are segregated into four three-bit data bit groups with a first data bit group 514 comprising bit positions 0-2; a second data bit group 516 comprising bit positions 3-5; a third data bit group 518 comprising bit positions 6-8; and a fourth data bit group 520 comprising bit positions 9-11.

Each of the four data bit groups of register 510 is coupled to one of the four data channel groups of network connection 260. First data bit group 514 is coupled to data channels 0-2 of first data channel group 262 via a three-bit wide data path 524. Second data bit group 516 is coupled to data channels 3-5 of second data channel group 262 via a three-bit wide data path 528. Third data bit group 518 is coupled to data channels 6-8 of third data channel group 266 via a three-bit wide data path 532. Fourth data bit group 520 is coupled to data channels 9-11 via a three-bit wide data path 536.

Mulitplexer module 504 comprises four 4-to-1 multiplexers, 540, 542, 544, and 546. Each of the four multiplexers 540, 542, 544, and 546 has four inputs and is coupled to each of the four three-bit data groups of buffer 510. Multiplexer 540 is coupled to first data bit group 514, to second data bit group 516, to third data bit group 518, and to fourth data bit group 520 via three-bit wide data paths 548, 550, 552, and 554. Multiplexer 542 is coupled to first data bit group 514, to second data bit group 516, to third data bit group 518, and to fourth data bit group 520 via three-bit wide data paths 556, 558, 560, and 562, respectively. Multiplexer 544 is coupled to first data bit group 514, to second data bit group 516, to third data bit group 518, and to fourth data bit group 520 via three-bit wide data paths 564, 566, 568, and 570, respectively. Multiplexer 546 is coupled to first data bit group 514, to second data bit group 516, to third data bit group 518, and to fourth data bit group 520 via three-bit wide data paths 572, 574, 576, and 578, respectively.

Output module 506 comprises a 12-bit register 580 having bit positions 0-11 as indicated at 582. Output register 580 is configured to provide 12-bit data blocks to the networked system as indicated at 583. Additionally, output register 580 is coupled to an output of each of the four multiplexers of multiplexer module 504. Bit positions 0-2 of output register 580 are coupled to the output of multiplexer 540 via a three-bit wide data path 584; bit positions 3-5 are coupled to the output of multiplexer 542 via a three-bit wide data path 586; bit positions 6-8 are coupled to the output of multiplexer 544 via a three-bit wide data path 588; and bit positions 9-11 are coupled to the output of multiplexer 546 via a three-bit data path 590.

Controller 508 receives status signal 277, via a line 592, indicative of functioning and non-functioning data channels 0-11 of network connection 260. Controller 508 provides a control signal on a line 598 to a selector input of multiplexer 540, a selector input of multiplexer 542, a selector input of multiplexer 544, and a selector input of multiplexer 546.

In one exemplary embodiment, receiving node 500 of FIG. 9 functions in a manner that is substantially the inverse to that of sending node 200, of FIG. 4. For illustrative purposes, the illustrative examples of FIG. 5 and FIG. 7 previously used to illustrate sending node 200 of FIG. 4 transmitting example flit 302 are used to illustrate receiving node 500 of FIG. 9 receiving example flit 302. Thus, as described below, FIG. 5 is an illustrative diagram of an example transmission scenario 300 where receiving node 500 of FIG. 9 receives the example flit 302 via a full networked data path of network connection 260 when all data channels 0-11 are functioning.

As indicated at 310, during cycle 0, staging register 520 receives data bits 0-2 into bit positions 0-2, as indicated at 514, via three-bit wide data path 270; receives data bits 3-5 into bit positions 3-5, as indicated at 516, via three-bit wide data path 272; receives data bits 6-8 into bit positions 6-8, as indicated at 518, via three-bit wide data path 274; and receives data bits 9-11 into bit positions 9-11, as indicated at 520, via three-bit wide data path 276.

Controller 508 receives connection status signal 277 indicating that each of the data channels 0-11 of network connection 260 is functioning. Controller 508 instructs multiplexer 540, via selector line 598, to receive data bits 0-2 from bit positions 0-2, indicated at 514, via three-bit wide data path 548, and to transmit data bits 0-2 via three-bit wide data path 584 to bit positions 0-2 of output register 580.

Controller 508 instructs multiplexer 542, via selector line 598, to receive data bits 3-5 from bit positions 3-5, indicated at 516, via three-bit wide data path 558, and to transmit data bits 3-5 via three-bit wide data path 586 to bit positions 3-5 of output register 580. Controller 508 instructs multiplexer 544, via selector line 598, to receive data bits 6-8 from bit positions 6-8, indicated at 518, via three-bit wide data path 568, and to transmit data bits 6-8 via three-bit wide data path 588 to bit positions 6-8 of output register 580. Controller 508 instructs multiplexer 546, via selector line 598, to receive data bits 9-11 from bit positions 9-11, indicated at 520, via three-bit wide data path 578, and to transmit data bits 9-11 via three-bit wide data path 590 to bit positions 9-11 of output register 580.

The remaining data bits are received in a similar manner, with bits 12-23, indicated at 312, being received at a cycle 1; bits 24-35, indicated at 314, being received at a cycle 2; bits 36-47, indicated at 316, being received at a cycle 3; bits 48-59, indicated at 318, being received at a cycle 4; and bits 60-71, indicated at 320, being received at a cycle 5. Thus, when all data channels 0-11 are functioning, receiving node 500 receives the 72-bits of data of flit 302 via the full network data path of network connection 260 in six cycles.

FIG. 7, as described below, is an illustrative diagram of an example transmission scenario 370 where receiving node 500 of FIG. 9 receives the example flit 302 via a degraded network data path of network connection 260 when two data channels of network connection data channels 0-11, indicated at 306, are not functioning. In the example transmission scenario 370, the non-functioning data channels are data channel 2, indicated at 372, and data channel 11, indicated at 374. Nevertheless, the illustration of FIG. 7 can be adapted to other transmission scenarios where the two non-functioning data channels are data channels other than data channels 2 and 11.

In the illustrative diagram of example transmission scenario 370, controller 508 receives connection status signal 277 indicating that data channels 2 and 11 of the data channels 0-11 of network connection 260, respectively indicated at 372 and 374, are not functioning. As indicated at 380, during cycle 0, staging register 520 receives data bits 0-2 into bit positions 3-5, indicated at 516, from data channel group 1, indicated at 264, via three-bit wide data path 272, and receives data bits 3-5 into bit positions 6-8, indicated at 518, from data channel group 2, indicated at 266, via three-bit wide data path 274. Also during cycle 0, indicated at 380, controller 508 instructs multiplexer 540, via selector line 598, to receive data bits 0-2 from bit positions 3-5, indicated at 516, via three-bit wide data path 550, and to transmit data bits 0-2 via three-bit data path 584 to bit positions 0-2 of output register 580. Controller 508 instructs multiplexer 542, via selector line 598, to receive data bits 3-5 from bit positions 6-9, indicated at 518, via three-bit wide data path 560, and to transmit data bits 3-5 via three-bit data path 586 to bit positions 3-5 of output register 580.

As indicated at 382, during cycle "1," staging register 520 receives data bits 6-8 into bit positions 3-5, indicated at 516, from data channel group 1, indicated at 264, via three-bit wide data path 272, and receives data bits 9-11 into bit positions 6-8, indicated at 518, from data channel group 2, indicated at 266, via three-bit wide data path 274.oup 534. Also during cycle 0, indicated at 380, controller 508 instructs multiplexer 544, via selector line 598, to receive data bits 6-8 from bit positions 3-5, indicated at 516, via three-bit wide data path 566, and to transmit data bits 6-8 via three-bit data path 588 to bit positions 6-8 of output register 580. Controller 508 instructs multiplexer 546, via selector line 598, to receive data bits 9-11 from bit positions 6-8, indicated at 518, via three-bit wide data path 576, and to transmit data bits 9-11 via three-bit data path 590 to bit positions 9-11 of output register 580.

The remaining data bits are received in a similar manner, with bits 12-17, indicated at 384, being received at a cycle 2; bits 18-23, indicated at 386, being received at cycle 3; bits 24-29, indicated at 388, being received at a cycle 4; bits 30-35, indicated at 390, being received at a cycle 5; bits 36-41, indicated at 392, being received at a cycle 6; bits 42-47, indicated at 394, being received at cycle 7; bits 48-53, indicated at 396, being received at cycle 8; bits 54-59, indicated at 398, being received at cycle 9; bits 60-65, indicated at 400, being received at cycle 10; and bits 66-71, indicated at 402, being received at a cycle 11. Thus, when two data channels of the 0-11data channels of network connection 260 are not functioning, receiving node 500 receives the 72-bits of data of flit 302 via the degraded network data path of network connection 260 in 12 cycles.

While the example embodiments of sending node 200 of FIG. 4 and receiving node 500 of FIG. 9 and transmission scenarios 330 and 370 respectively of FIG. 6 and FIG. 7 illustrate operation of the present invention in a degraded mode that is one-half the total data channels of the network connection 260 when one or two data channels have failed, and in a degraded mode that is one-quarter the total data channels when three data channels have failed (i.e., FIG. 8), the present invention can be implemented to operate in a degraded mode having any ratio of functioning channels to total data channels. The higher the ratio of functioning data channels to total data channels comprising the network connection to be used in a degraded mode of operation, the higher the reliability of the network connection. However, the higher the ratio to be utilized, the higher the number of multiplexers that will need to be utilized by the sending and receiving nodes, and consequently, the more complex and costly the circuitry.

For example, an alternate embodiment according to the present invention of sending node 200 of FIG. 4 comprises a multiplexer module 204 comprising twelve 12-to-1 multiplexers. In this alternate embodiment, each multiplexer has twelve twelve-bit data channels with each twelve-bit data channel being coupled to each of the twelve buffer register bit positions labeled as 0-11 at 210. An output of each multiplexer is coupled to each of the twelve data channels, labeled as 0-11, of the network connection 260 via a twelve-bit data path to form twelve one-channel data channel groups.

FIG. 10 is an illustrative diagram of example transmission scenario 610 where sending node 200 of FIG. 4, as modified by the alternate embodiment as described by the above paragraph, transmits example flit 302 via a degraded network data path of network connection 260 when three data channels of the network connection data channels 0-11, indicated at 306, are not functioning. In example transmission scenario 610, the non-functioning data channels are data channels 2, 6, and 11, indicated at 620, 622, and 624 respectively. Nevertheless, the illustration of FIG. 10 can be adapted to other transmission scenarios where the three non-functioning data channels are data channels other than data channels 2, 6, and 11.

Controller 206 receives status signal 277 indicating that data channels 2, 6, and 11 are not functioning. Controller 206 removes data channel groups 2, 6, and 11 from operation, as indicated respectively by the hatched lines at 620, 622 and 624, by instructing the three associated multiplexers to not receive data, and places data channel groups 8, 9, and 10 in "standby" mode as indicated by dashes at 626.

As indicated at 628, during cycle 0, bits 0-5 are transmitted via data channels 0, 1, 3, 4, 5 and 7, respectively. Remaining data bits 6-72 are transmitted in a similar fashion at cycles 1-11, as indicated at 630. Thus, in the alternative embodiment, when three data channels of the data channels 0-11 of network connection 260 are not functioning, sending node 200 to transmits the 72-bits of data flit 302 via the degraded network path of network connection 260 in 12 cycles. In fact, in this alternative embodiment, three additional data channels can fail and be replaced by "standby" data channels 8, 9 and 10 at 626, and sending node 200 can continue to transmit the 72-bits of flit 302 in twelve cycles via alternative degraded data paths. Sending node 200 will not require more than twelve cycles to transmit the 72-bits of flit 302 until at least seven data channels have failed. Contrast this with sending node 200 of FIG. 4, utilizing four multiplexers (220, 222, 224 and 226) as illustrated in FIG. 8, where 24 cycles were required to transmit the 72-bits of flit 302 when three data channels are not functioning. However, while the reliability of the network connection is enhanced by employing twelve multiplexers, as illustrated by example transmission scenario 610 of FIG. 10, as compared to example transmission scenario 410 of FIG. 8, the complexity and cost of the required circuitry is also increased.

In conclusion, a networked system according to the present invention can improve the reliability of the network connection by providing for each data bit multiple network connection data channels for transmission. By providing multiple data channels for the transmission of each data bit, a networked system according to the present invention can continue transmitting data in a degraded mode in the presence of multiple data channel failures. In addition to providing a more robust network connection, a networked system according to the present invention can have network connections of varying widths in the system, but utilize the same protocol throughout the system.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A sending node comprising:
   a buffer configured to receive at least one data block having M data bits in an original bit order; and
   a multiplexer module coupled to the buffer and adapted to couple to a network connection having at least M data channels to form a full network data path comprising M functioning data channels, and configured to receive the at least one data block and to receive a status signal indicative of functioning and non-functioning data channels, configured to provide the at least one data block in a full transmission bit order via the full network data path at a full data block transmission rate, and configured to provide the at least one data block in a degraded transmission bit order at a degraded data block transmission rate via a selected degraded network data path comprising at least one but less than M functioning data channels;
   wherein the M network connection data channels are segregated to form N data channel groups, wherein M is an integer greater than one, and N is an integer ranging from two to M, and wherein the full network data path comprises N data channel groups and the selected degraded network data path comprises at least one, but less than N, data channel groups; and
   wherein the multiplexer module comprises N multiplexers, wherein each multiplexer has an N-to-one ratio and has an output coupled to a corresponding data channel group.

2. The sending node of claim 1 further comprising:
   a controller configured to receive the status signal indicative of functioning and non-functioning data channels, and configured to provide to the multiplexer module a selector signal instructing the multiplexer module to provide the at least one data block in the full transmission bit order via the full network data path or to provide the at least one data block in a selected degraded transmission bit order via a selected degraded network data path.

3. The sending node of claim 2, wherein the controller includes a look-up table comprising:
   a predetermined combination of the full transmission bit order and the at least M data channels to utilize as the full network data path when the at least M data channels are functioning; and
   a plurality of predetermined combinations of degraded transmission bit orders and less than M data channels to utilize as degraded network data paths when less than M functioning data channels are available.

4. The sending node of claim 1, wherein the buffer is a register having M bit positions.

5. The sending node of claim 4, wherein the buffer register is segregated to form N sub-registers, and wherein each sub-register is coupled to an input of each multiplexer.

6. The sending node of claim 5, wherein multiplexer input selection is by sub-register.

7. The sending node of claim 6, wherein at least one of the multiplexers receives up to M bits of the at least one data block from the N buffer sub-registers over one to N consecutive cycles.

8. A receiving node comprising: a staging module adapted to couple to a network connection having at least M data channels to form a full network data path comprising M functioning data channels and configured to receive at least one data block at a full data block transmission rate in a full transmission bit order via the full network data path, and configured to receive the at least one data block at a degraded data block transmission rate in a degraded transmission bit order via a selected degraded network data path comprising at least one but less than M data channels; and
   a multiplexer module coupled to the staging module configured to receive the at least one data block and to receive a status signal indicative of functioning and non-functioning data channels, and configured to provide the at least one data block in an original bit order;
   wherein the M network connection data channels are segregated to form N data channel groups, wherein M is an integer greater than one, and N is an integer ranging from two to M, and wherein the full network data path comprises N data channel groups and the selected degraded network data path comprises at least one, but less than N, data channel groups;
   wherein the staging module comprises a register having M bit positions, wherein the staging module register is segregated to form N sub-registers, and wherein each sub-register is coupled to a corresponding data channel group; and wherein the multiplexer module comprises N multiplexers, wherein each multiplexer has an N-to-one ratio and has an input coupled to each sub-register of the staging module and has an output.

9. The receiving node of claim 8, further comprising:
an output module coupled to the multiplexer module and configured to receive and hold the at least one data block in the original bit order.

10. The receiving node of claim 8, further comprising:
a controller configured to receive the status signal indicative of functioning and non-functioning data channels, and configured to provide to the multiplexer module a selector signal instructing the multiplexer module to receive the at least one data block in the full transmission bit order at the full data block transmission rate or to receive the at least one data block in the selected degraded transmission bit order at the degraded data block transmission rate.

11. The receiving node of claim 10, wherein the controller includes a look-up table comprising:
a predetermined combination of the full transmission bit order and the at least M data channels to utilize as the full network data path when the at least M data channels are functioning; and
a plurality of predetermined combinations of degraded transmission bit orders and less than M data channels to utilize as degraded network data paths when less than M functioning data channels are available.

12. The receiving node of claim 8, wherein the staging module is a register having M bit positions.

13. The receiving node of claim 9, wherein the output module is a register having M bit positions.

14. The receiving node of claim 8, wherein the output module comprises a register having M bit positions, wherein the output module register is segregated to form N sub-registers, and wherein each sub-register is coupled to a corresponding multiplexer output.

15. The receiving node of claim 14, wherein multiplexer input selection is by sub-register.

16. The receiving node of claim 14, wherein at least one of the multiplexers receives up to M bits of the at least one data block from the N staging module sub-registers over one to N consecutive cycles.

17. A networked system comprising: a network connection having at least M data channels;
a sending node coupled to the network connection to form a full network data path having M functioning data channels and comprising:
a buffer configured to receive at least one data block having M data bits in an original order; and
a multiplexer module configured to receive the at least one data block and a status signal indicative of functioning and non-functioning data channels, and configured to provide the at least one data block in a full transmission bit order at a full data block transmission rate via the full network data path and in a degraded transmission bit order at a degraded data block transmission rate via a selected degraded network data path comprising less than M functioning data channels;
wherein the M network connection data channels are segregated to form N data channel groups, wherein M is an integer greater than one, and N is an integer ranging from two to M, and wherein the full network data path comprises N data channel groups and the selected degraded network data path comprises at least one, but less than N, data channel groups; and
wherein the sending node multiplexer module comprises N multiplexers, wherein each multiplexer has an N-to-one ratio and has an output coupled to a corresponding data channel group; and
a receiving node coupled to the network connection and comprising:
a staging module configured to receive the at least one data block from the sending node; and
a multiplexer module configured to receive the status signal and to provide the at least one data block in the original bit order.

18. The networked system of claim 17 further comprising:
a controller configured to receive the status signal indicative of functioning and non-functioning data channels, and configured to provide to the sending node multiplexer module a selector signal instructing the sending node multiplexer module to provide the at least one data block in the full transmission bit order via the full network data path or to provide the at least one data block in a selected degraded transmission bit order via a selected degraded network data path, and configured to provide to the receiving node multiplexer module a selector signal instructing the receiving node multiplexer module to receive the at least one data block in the full transmission bit order at the full data block transmission rate or to receive the at least one data block in the selected degraded transmission bit order at the degraded data block transmission rate.

19. The networked system of claim 18, wherein the controller includes a look-up table comprising:
a predetermined combination of the full transmission bit order and the at least M data channels to utilize as the full network data path when the at least M data channels are functioning; and
a plurality of predetermined combinations of degraded transmission bit orders and less than M data channels to utilize as degraded network data paths when less than M functioning data channels are available and which are a function of the non-functioning data channels.

20. The networked system of claim 18, wherein the receiving node further comprises:
an output module coupled to the receiving node multiplexer module and configured to receive and hold the at least one data block in the original bit order.

21. The networked system of claim 20, wherein the output module is a register having M bit positions.

22. The networked system of claim 17, wherein the buffer is a register having M bit positions.

23. The networked system of claim 17, wherein the staging module is a register having M bit positions.

24. The networked system of claim 17, wherein the buffer register is segregated to form N sub-registers, and wherein each sub-register is coupled to an input of each multiplexer of the sending node multiplexer module.

25. The networked system of claim 24, wherein multiplexer input selection is by sub-register.

26. The networked system of claim 24, wherein at least one of the multiplexers receives up to M bits of the at least one data block from the N buffer sub-registers over one to N consecutive cycles.

27. The networked system of claim 17, wherein the staging module comprises a register having M bit positions, wherein the staging module register is segregated to form N sub-registers, and wherein each staging module sub-register is coupled to a corresponding data channel group.

28. The networked system of claim 27, wherein the receiving node multiplexer module comprises:

N multiplexers, wherein each multiplexer has an N-to-one ratio and has an input coupled to each sub-register of the staging module register and has an output.

29. The networked system of claim 28, wherein the output module comprises a register having M bit positions, wherein the output module register is segregated to form N sub-registers, and wherein each output module sub-register is coupled to a corresponding multiplexer output.

30. The networked system of claim 29, wherein multiplexer input selection is by sub-register.

31. The networked system of claim 29, wherein at least one of the multiplexers receives up to M bits of the at least one data block from the N staging module sub-registers over one to N consecutive cycles.

* * * * *

UNITED STATES PATENT AND TRADEMARK OFFICE
CERTIFICATE OF CORRECTION

| | |
|---|---|
| PATENT NO. | : 7,505,486 B2 |
| APPLICATION NO. | : 10/300444 |
| DATED | : March 17, 2009 |
| INVENTOR(S) | : Debendra Das Sharma |

Page 1 of 1

It is certified that error appears in the above-identified patent and that said Letters Patent is hereby corrected as shown below:

In column 5, line 46, delete "fill" and insert -- full --, therefor.

Signed and Sealed this

Eleventh Day of August, 2009

David J. Kappos
*Director of the United States Patent and Trademark Office*